United States Patent [19]
Hattori et al.

[11] Patent Number: 5,128,994
[45] Date of Patent: Jul. 7, 1992

[54] TELEPHONE HANDSET WITH MAGNETIC HOLDER

[75] Inventors: Yoshihiro Hattori; Michio Yamasaki, both of Hyogo, Japan

[73] Assignee: Mitsubishi Denki Kabushiki Kaisha, Tokyo, Japan

[21] Appl. No.: 571,354

[22] Filed: Aug. 22, 1990

[30] Foreign Application Priority Data

Mar. 15, 1990 [JP] Japan .................. 2-64858

[51] Int. Cl.$^5$ .................................. H04M 1/00
[52] U.S. Cl. .................... 379/455; 379/426; 379/433
[58] Field of Search ............... 379/455, 454, 426, 424, 379/435, 449, 433; 24/303; 248/309.1, 309.4

[56] References Cited

U.S. PATENT DOCUMENTS

| 4,265,002 | 5/1981 | Hosken | 24/303 |
| 4,505,007 | 3/1985 | Aoki | 24/303 |
| 4,581,490 | 4/1986 | Genender | 379/424 |
| 4,747,136 | 5/1988 | Kiesewetter | 379/455 |

FOREIGN PATENT DOCUMENTS

| 027188 | 4/1981 | European Pat. Off. | |
| 2384396 | 10/1978 | France | 379/424 |
| 3513698 | 10/1986 | German Democratic Rep. | 379/424 |
| 0585137 | 11/1958 | Italy | 379/424 |
| 0001350 | 1/1987 | Japan | 379/433 |
| 621350 | 1/1987 | Japan . | |
| 62-146052 | 6/1987 | Japan . | |
| 64-67055 | 3/1989 | Japan . | |

Primary Examiner—James L. Dwyer
Assistant Examiner—Jason Chan
Attorney, Agent, or Firm—Rothwell, Figg, Ernst & Kurz

[57] ABSTRACT

A handset device which includes a small magnet unit, is simple in construction, and yet ensures the magnetic holding of a handset and the outputting of an on-hook signal when it is hung up on a main body. The magnet unit is provided in one of a portion of the main body and a portion of the handset which face each other when the handset is hung up, while a magnetic material is provided in the other of those portions, so that a magnetic attracting force may occur between the magnet unit and the magnetic material. The magnetic material has a saturation magnetic flux density which is lower than that of the magnet unit, so that magnetic leakage may occur. A magnetic detector is provided for detecting such magnetic leakage and outputting the on-hook signal.

10 Claims, 5 Drawing Sheets

TELEPHONE HANDSET WITH MAGNETIC HOLDER

BACKGROUND OF THE INVENTION

1. Field of the Invention

This invention relates to a handset which is used as a part of a telephone, such as one installed in an automobile.

2. Description of the Prior Art

A handset is in common use as a telephone receiver. It is taken off the main body of the telephone to start a telephone call, and is hung up to end it. The use of the handset is detected by a mechanical switching system.

A known handset is disclosed in, for example, the Japanese Patent Application filed by Matsushita Electric Industrial Co., Ltd. on Dec. 20, 1985 and laid open to the public under No. 146052/1987 on Jun. 30, 1987 prior to examination on the merits. It is constructed as shown in FIG. 1 of the accompanying drawings, and is removably held on the main body of a telephone by the combination of mechanical engagement and magnetic attraction. The main body 1 of the telephone has a projection 2 and the handset 7 has a hole 3 in which the projection 2 is removably engaged. The main body 1 is provided with a permanent magnet 4 facing the handset 7. The handset 7 is provided with a magnetic flux detector 5 and a magnetic material 6 both facing the permanent magnet 4. The detector 5 is actuated by detecting the magnetic flux of the permanent magnet 4 and the permanent magnet 4 and the magnetic material 6 produce a magnetic attracting force therebetween.

If the handset 7 is taken off the main body 1, the magnetic flux detector 5 ceases to detect any magnetic flux and produces an OFF signal. If the handset 7 is hung up, the detector 5 detects the magnetic flux of the permanent magnet 4 and produces an ON signal. The magnetic attracting force occurring between the permanent magnet 4 and the magnetic material 6, as well as the engagement of the projection 2 in the hole 3, ensures that the handset 7 be securely held on the main body 1 when hung up.

A switching mechanism including a magnetic catch is disclosed in the Japanese Utility Model Application filed by Uniden Co., Ltd. on Mar. 27, 1987 and laid open to the public under No. 152335/1988 on Oct. 6, 1988 prior to examination on the merits. This mechanism is employed in an automobile telephone set as shown in FIGS. 2 and 3.

The telephone set comprises a base unit 40 and a handset 50. The base unit 40 is provided with a permanent magnet 11 and two yokes 12, and the handset 50 is provided with a principal magnetic member 15 facing the yokes 12. The magnet 11, yokes 12, and magnetic member 15 define a magnetic catch 10 when the magnetic member 15 is attracted by the magnet 11. Each yoke 12 has an edge projection 14 provided for holding the magnetic member 15 by magnetic attraction when the handset 50 is hung up. The edge projection 14 defines an edge portion 13 which is recessed, or located apart from the magnetic member 15 when the handset 50 is hung up. The magnetic member 15 is partly cut so as not to cover fully the adjacent edges of the yokes 12, so that the recessed edge portions 13 of the yokes 12 may allow for the leakage of magnetic flux. The handset 50 is further provided with an auxiliary magnetic member 20 and a magnetic sensor element 30 which face the recessed edge portions 13 of the yokes 12. When the handset 50 is hung up, the leaking magnetic flux flows along a closed path F defined by the recessed edge portions 13 of the yokes 12, the auxiliary magnetic member 20 and the magnetic sensor element 30, and the element 30 outputs an ON signal, while it outputs an OFF signal when the handset 50 is not hung up.

In the device as shown in FIG. 1, however, the same permanent magnet 4 is used for both detecting the handset 7 and holding it and the magnetic detector 5 and the magnetic material 6 are both juxtaposed to the magnet 4. These features make it essential that the magnet 4 be large enough, and that the device as a whole be correspondingly large.

In the device as shown in FIGS. 2 and 3, it is necessary to use a sufficiently long permanent magnet 11 or arrange the relevant parts in a mutually displaced way in order to ensure the leakage of magnetic flux from the magnet 11, while the auxiliary magnetic member 20 is essential for preventing the scattering of the leaking magnetic flux. Therefore, the device necessarily is large and comprises a large number of parts forming a complicated arrangement.

A small size, as well as a high level of performance, is now required of a handset. Moreover, the user is inclined from a standpoint of human engineering to choose a device having a shape defined by many curved lines and planes. While a handset and the main body of a telephone, or a stand on which the handset is placed become smaller, they are, on the contrary, required to contain a greater number of parts to achieve a higher level of performance.

Therefore, a more compact and simpler construction is required of those portions at which the handset is held on the main body of the telephone when hung up. This requirement is also essential to enable the realization of a configuration defined by many curved planes. Moreover, the use of a greater number of parts imposes more restrictions on the possible arrangement of those parts in the limited space defined by the handset or the main body of the telephone and thereby on the possible shape of the handset or the main body of the telephone.

The device as shown in FIG. 1 cannot, however, be constructed with a satisfactorily curved configuration, as it calls for a permanent magnet having a large flat surface area. The device as shown in FIGS. 2 and 3 has already a greatly limited inner space due to the presence of the auxiliary magnetic member and other parts associated therewith.

SUMMARY OF THE INVENTION

Under these circumstances, it is an object of this invention to provide a handset which can be magnetically held on the main body of a telephone when hung up, and detected when hung up or taken off, by a simple combinaof parts including a relatively small magnet.

It is another object of this invention to provide a handset which is free of any parts that are likely to impose any substantial restriction on the positioning of a magnetic detector.

These objects are essentially attained by a handset device which comprises a handset supported removably on a main body, a magnet member provided in one of a portion of the handset and a portion of the main body which face each other when the handset is supported on the main body, a magnetic material provided in the other of those portions, so that a magnetic attracting force may occur between the magnet member and the magnetic material when the handset is supported on the main body, the magnetic material having a saturation magnetic flux density which is lower than that of the magnet member, so that magnetic flux may leak from the magnetic material, and a magnetic detector provided behind the magnetic material for operation by detecting the magnetic flux leaking from the magnetic material.

The device of this invention does not call for the use of any large magnet, but is simple and compact in construction, and can, therefore, be manufactured at a low cost. The magnetic flux leaking from the magnetic material ensures that the handset be properly held on the main body when hung up, and that the magnetic detector properly function to output a corresponding signal.

The area in which the magnet member and the magnetic material are adapted to face each other is so small that the handset may have a configuration defined by a variety of curved lines and planes which play an important role in raising the ornamental value of the device.

DETAILED DESCRIPTION OF THE INVENTION

The invention will now be described in detail with reference to the accompanying drawings showing a few preferred embodiments thereof.

Figure 1:
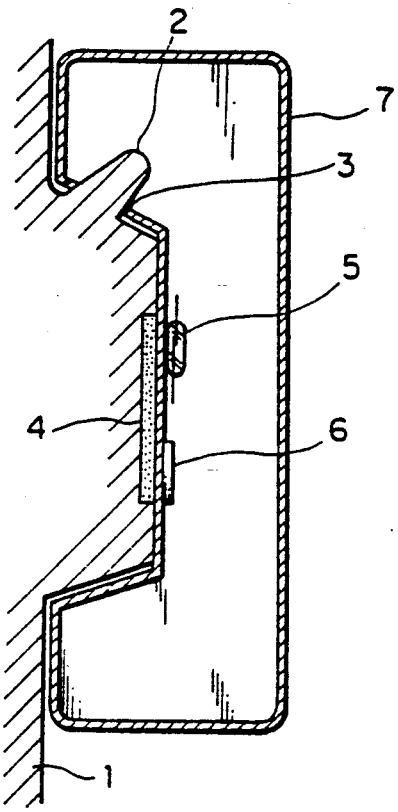
FIG. 1 is a side elevational view, in section, of a known handset device.
Figure 6:
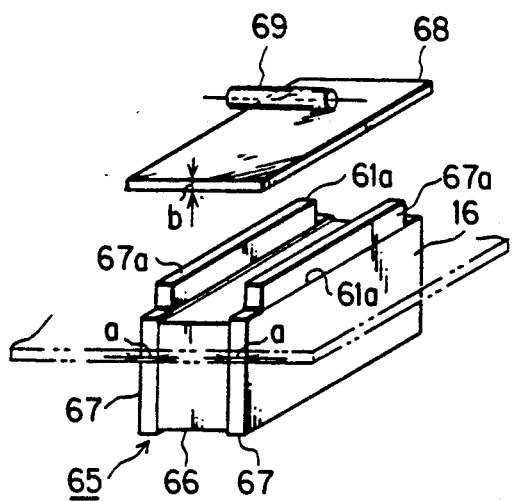
FIG. 6 is an enlarged exploded perspective view of a portion of the device shown in FIG. 4.
Figure 7:
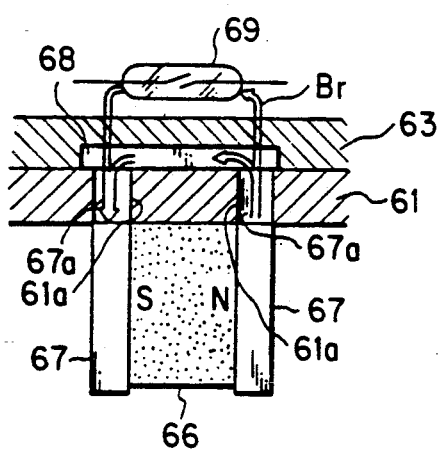
FIG. 7 is an enlarged side elevational view, in section, of the portion shown in FIG. 6.
Figure 3:
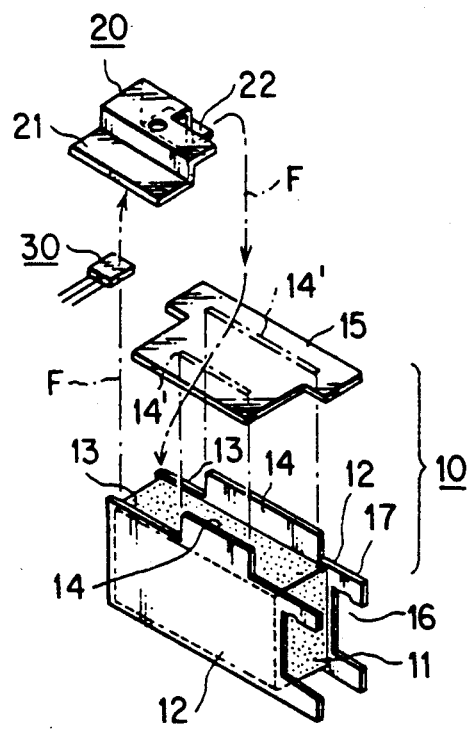
FIG. 3 is an exploded perspective view of a portion of the device shown in FIG. 2.
Figure 2:
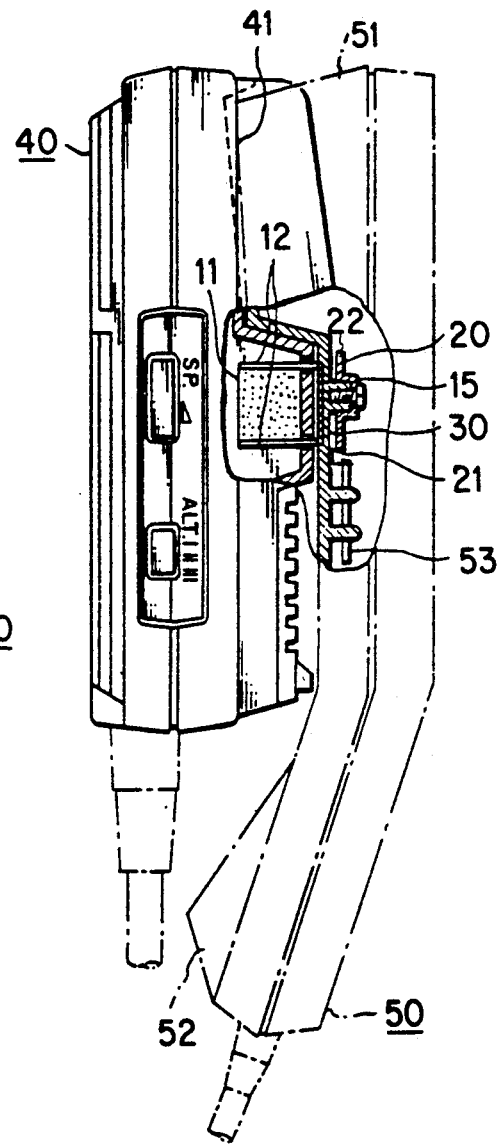
FIG. 2 is a partly cutaway side elevational view of another known handset device.
Figure 4:
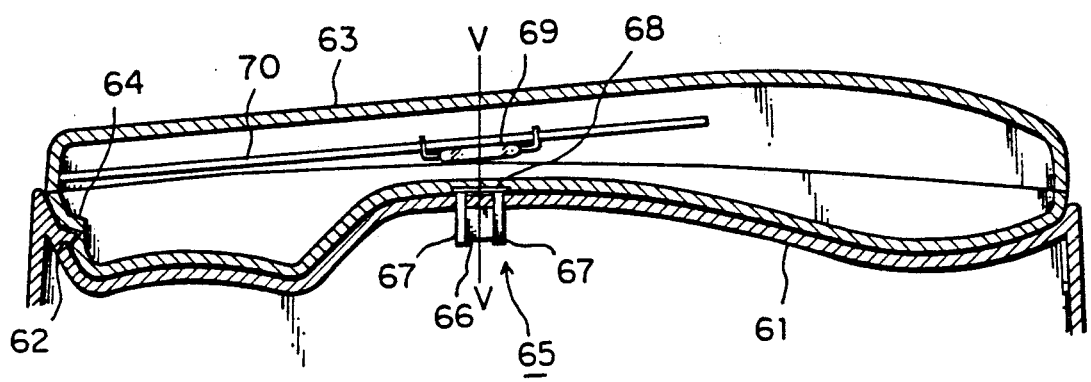
FIG. 4 is a side elevational view, in section, of a handset device embodying this invention.

Referring first to FIG. 4, a handset device embodying this invention comprises a main body 61 provided with a projection 62 on its wall, and a handset 63 provided in its wall with a depression 64 in which the projection 62 is engageable as shown. A magnet unit 65 is provided in a portion of the main body 61 facing the handset 63 in its hung-up position. The magnet unit 65 comprises a permanent magnet 66 and a pair of yokes 67 provided on the opposite pole faces, respectively, of the magnet 66. Each yoke 67 has an edge projection 67a as shown in FIG. 6 or 7 and the wall of the main body 61 has a pair of slots 61a in which the edge projections 67a of the yokes 67 are respectively fitted, as shown in FIG. 7, whereby the magnet unit 65 is secured to the main body 61.

Figure 5:
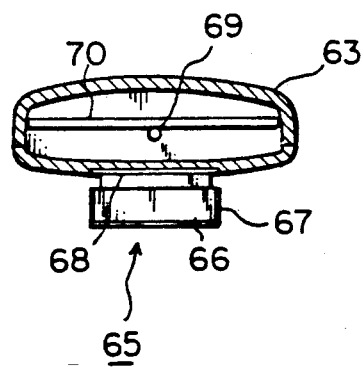
FIG. 5 is a sectional view taken along the line V—V of FIG. 4.

The handset 63 is provided with a magnetic material 68 adapted to face the edges of the yokes 67 when the handset 63 is hung up, so that a magnetic attracting force may occur between the yokes 67 and the magnetic material 68. The magnetic material 68 has a saturation magnetic flux density which is lower than that of the yokes 67, so that magnetic flux may leak from the magnetic material 68. A magnetic detector 69 is provided behind the magnetic material 68 and is supported on a printed-circuit board 70 in the hrndset 63, as shown in FIGS. 4 and 5. The magnetic detector 69 comprises, for example, a lead relay and is operable by detecting the magnetic flux leaking from the magnetic material 68.

When the handset 63 is off the main body 61, the magnetic detector 69 outputs an OFF signal, as it does not detect any magnetic flux. This is the situation which corresponds to the off-hook position of a telephone.

If the handset 63 is hung up on the main body 61 as shown in FIG. 4, the yokes 67 and the magnetic material 68 attract each other, while the projection 62 is engaged in the depression 64, so that the handset 63 is held securely on the main body 61.

The yokes 67 are so formed as to have an equal saturation magnetic flux density, and an equal thickness a which depends on the saturation magnetic flux density of the permanent magnet 66. The yokes 67 and the magnetic material 68 may be of the same material, and if such is the case, the magnetic material 68 has a thickness b which is smaller than the thickness a of the yokes 67, as shown in FIG. 6, so that the magnetic material 68 may have a saturation magnetic flux density which is lower than that of the yokes 67, and may allow magnetic flux to leak from the yokes 67 and form a magnetic loop passing behind the magnetic material 68. The magnetic detector 69 is situated in the magnetic loop and outputs an ON signal when the handset 63 is hung up. This is the situation which corresponds to the on-hook position of the telephone.

Figure 8:
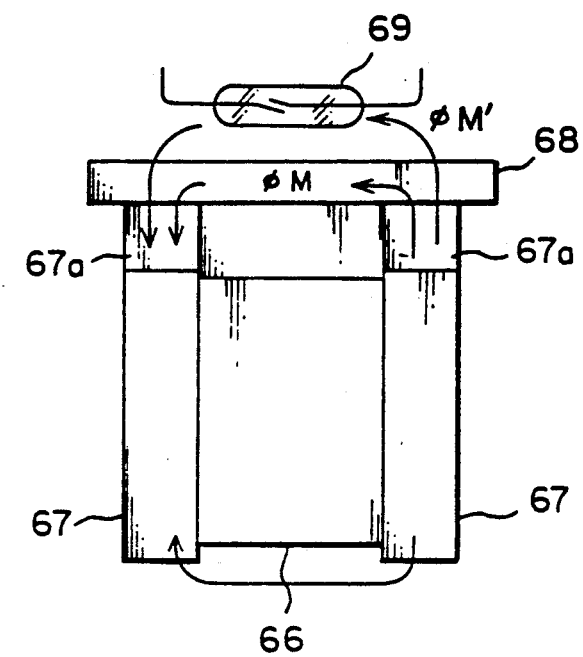
FIGS. 8(A) and 8(B) are views illustrating the flow of leaking magnetic flux in the device shown in FIGS. 4 to 7.
Figure 8:
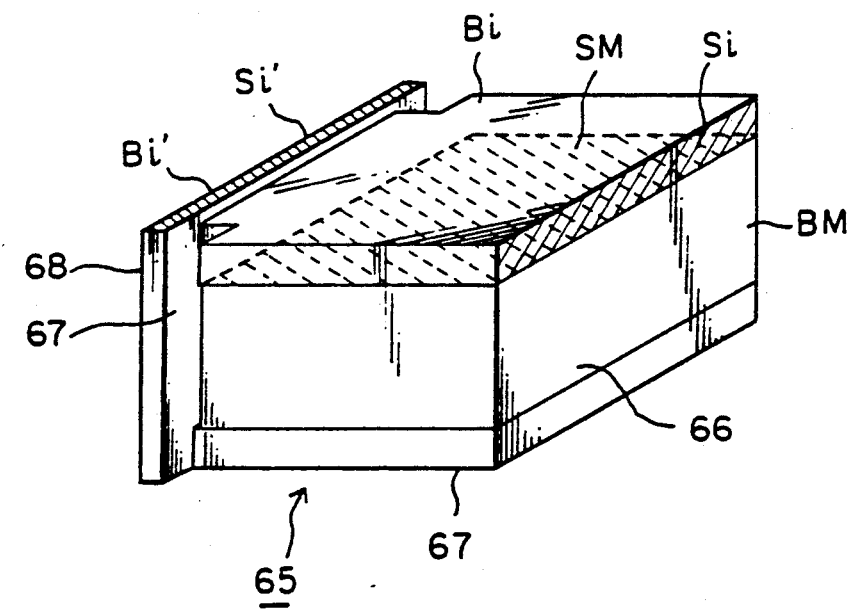

Reference is now made to FIGS. 8(A) and 8(B) showing the mechanism which causes the leakage of magnetic flux. The following relationships are first considered to exist:

$$\phi M = SM \times BM;$$

$$Bi = \frac{\phi M}{Si} = \frac{SM}{Si} \times BM;$$

$$Bi' = \frac{\phi M}{Si'} = \frac{SM}{Si'} + BM,$$

where BM is the saturation magnetic flux density of the permanent magnet 66, Bi is the saturation magnetic flux density of the yokes 67, Bi' is the saturation magnetic flux density of the magnetic material 68, SM is the area of the contacting surfaces of the permanent magnet 66 and the yokes 67, Si is the cross-sectional area of the yokes 67, S1' is the cross-sectional area of the magnetic material 68, and $\phi M$ is the strength of a magnetic field.

If Si is larger than Si', no magnetic leakage occurs unless Bi is lower than Bi', and if Bi is equal to Bi', no magnetic leakage occurs unless Si is equal to Si'.

If Si' is equal to a half of Si, and if the yokes 67 and the magnetic material 68 are of the same material, the leaking magnetic flux, $\phi M'$, is defined as:

$$\phi M = Bi \times (Si - Si') = Bi \times \frac{Si}{2} = \frac{1}{2} \times BiSi$$

It will be noted from the equation that the amount of magnetic leakage is proportional to a reduction in cross-sectional area of the magnetic material 68. Therefore, it is possible to obtain a different amount of magnetic leakage if the ratio in thickness of the magnetic material 68 to the yokes 67 is altered.

Although the magnetic detector 69 has been described as comprising a lead relay, it may alternatively comprise a Hall device, or anything else that is appropriate. Although the permanent magnet 66 has been described as being provided in the main body 61, and the magnetic material 68 and the magnetic detector 69 in the handset 63, it is possible to reverse the arrangement of those parts. Although the different saturation magnetic flux densities of the yokes 67 and the magnetic material 68 have been described as being achieved by their difference in thickness, the same can also be realized by employing different materials, for example, Permalloy and mild steel.

Figure 9:
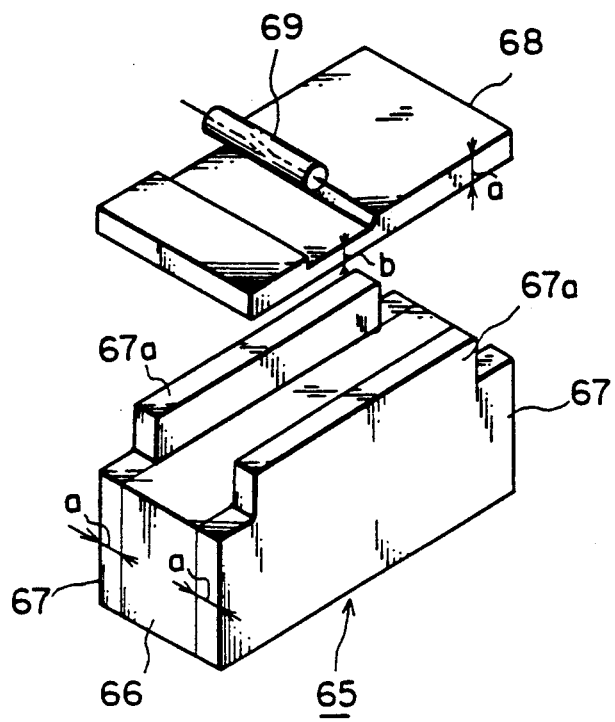
FIG. 9 is an exploded perspective view of the principal portion of a device according to another embodiment of this invention.

A different embodiment of this invention is shown in FIG. 9. It is characterized by including a magnetic material 68 having a portion with a thickness b which is smaller than the thickness a of the yokes 67, while the remaining portions thereof are equal in thickness to the yokes 67. Accordingly, it is only in that portion of smaller thickness that magnetic leakage occurs.

Figure 10:
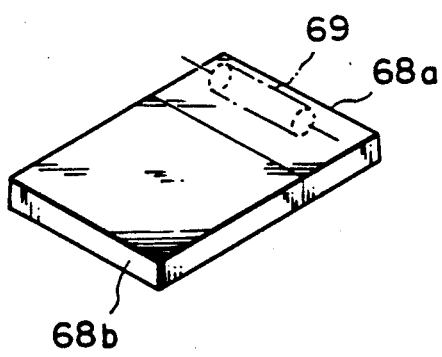
FIG. 10 is a perspective view of the principal portion of a device according to still another embodiment of this invention.
Figure 11:
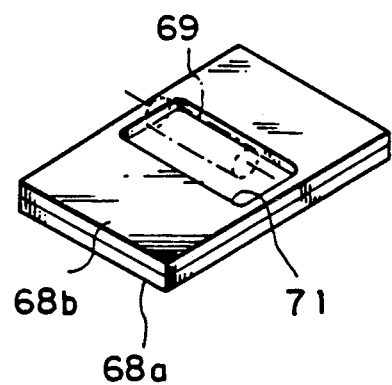
FIG. 11 is a view similar to FIG. 10, but showing a device according to a further embodiment of this invention.

Two modified forms of the device shown in FIG. 9 are shown by way of example in FIGS. 10 and 11, respectively. The device shown in FIG. 10 includes a magnetic material consisting of two flat plates 68a and 68b having different saturation magnetic flux densities and joined together to form a single plate. The device shown in FIG. 11 includes a magnetic material consisting of a flat plate 68a and a flat plate 68b having a depression or opening 71 and laid on, and bonded to, the plate 68a.

What is claimed is:

1. A telephone handset device, comprising:
   a main body;
   a handset removably held on said main body:
   one of said handset and said main body being provided with a magnet unit, and the other of said handset and said main body being provided with a magnetic material, such that an attractive magnetic force occurs between said magnet unit and said magnetic material when said handset is held on said main body;
   said magnetic material having a saturation magnetic flux density which is lower than a saturation magnetic flux density of said magnet unit, to cause magnetic flux leakage to occur outside said magnetic material when said handset is held on said main body; and
   magnetic flux detector means for detecting said magnetic flux leakage, located in the path of said magnetic flux leakage outside said magnetic material.

2. A device as set forth in claim 1, wherein said magnet unit is provided in said main body, and said magnetic material and said magnetic flux detector means are provided in said handset.

3. A device as set forth in claim 1, wherein said magnet unit is provided in said handset, and said magnetic material and said magnetic flux detector means are provided in said main body.

4. A device as set forth in claim 1, wherein said magnet unit comprises a permanent magnet and a pair of yokes between which said permanent magnet is disposed, said yokes and said magnetic material being of the same material, and said magnetic material being smaller in cross-sectional area than each of said yokes to achieve said saturation magnetic flux density lower than said magnet unit.

5. A device as set forth in claim 1, wherein a portion of said magnetic material is formed to achieve said saturation magnetic flux density lower than said magnet unit.

6. A device as set forth in claim 5, wherein said magnetic material is formed of two parts differing from each other in saturation magnetic flux density and joined together to lie in a single plane, one of said parts defining said portion of said magnetic material.

7. A device as set forth in claim 6, wherein said two parts are of Permalloy and mild steel, respectively.

8. A device as set forth in claim 5, wherein said magnet unit comprises a permanent magnet and a pair of yokes between which said permanent magnet is disposed, and said portion of said magnetic material has a thickness which is smaller than that of each of said yokes.

9. A device as set forth in claim 1, wherein said magnetic flux detector means comprises a lead relay.

10. A device as set forth in claim 1, wherein said magnetic flux detector means comprises a Hall device.

* * * * *

UNITED STATES PATENT AND TRADEMARK OFFICE
CERTIFICATE OF CORRECTION

PATENT NO. : 5,128,994

DATED : July 7, 1992

INVENTOR(S) : Yoshihiro Hattori et al.

It is certified that error appears in the above-identified patent and that said Letters Patent is hereby corrected as shown below:

Column 2, line 56, "combinaof" should be --combination of--.

Column 4, line 12, "hrndset" should be --handset--.

Signed and Sealed this

Twelfth Day of October, 1993

Attest:

BRUCE LEHMAN

*Attesting Officer*   *Commissioner of Patents and Trademarks*